US005818676A

United States Patent [19]

Gronowicz, Jr.

[11] Patent Number: 5,818,676

[45] Date of Patent: Oct. 6, 1998

[54] MULTIPLE ELEMENT PTC OVERCURRENT PROTECTION DEVICE

[75] Inventor: William Gronowicz, Jr., Westland, Mich.

[73] Assignee: Yazaki Corporation, Tokyo, Japan

[21] Appl. No.: 857,910

[22] Filed: May 16, 1997

[51] Int. Cl.[6] .......... H02H 5/04

[52] U.S. Cl. .......... 361/106; 338/22 R

[58] Field of Search .......... 361/18, 56, 111, 361/119, 103, 106, 118, 124, 126, 127; 337/163, 164; 338/22 R

[56] References Cited

U.S. PATENT DOCUMENTS

| | | | |
|---|---|---|---|
| 5,663,861 | 9/1997 | Reddy et al. | 361/106 |
| 5,724,221 | 3/1998 | Law | 361/127 |

*Primary Examiner*—Ronald W. Leja

*Attorney, Agent, or Firm*—Young & Basile, P.C.

[57] ABSTRACT

A self-resetting circuit overcurrent protection device comprises two or more flat positive temperature coefficient (PTC) elements, each comprising a layer of PTC material sandwiched between two metal plates, disposed in a parallel, overlapping configuration and connected in electrical parallel. The resulting circuit protection device has a hold current equal to the sum of the hold currents of the component PTC elements, while having a surface area no greater than that of a PTC device comprising only one of the component PTC elements. In the preferred embodiment of the invention, two PTC elements are used and one of the metal plates belonging to each of the PTC elements has a blade terminal integrally formed therewith, the terminals being substantially identical in configuration to the terminals of a standard automotive fuse which the device is intended to replace.

12 Claims, 1 Drawing Sheet

MULTIPLE ELEMENT PTC OVERCURRENT PROTECTION DEVICE

FIELD OF THE INVENTION

This invention relates to self-resetting circuit overcurrent protection devices employing positive temperature coefficient materials.

BACKGROUND OF THE INVENTION

A circuit overcurrent protection device is an electrical circuit component which passes up to a certain level of electrical current, but "trips" or creates an open-circuit condition if the level of current rises above a certain limit. A fusible link is an example of such a device, the fuse "blowing" or "burning out" due to the increased temperature resulting from passage of a level of current above the fuse rating. After a fuse has blown, it must be removed from the circuit and replaced with a new, intact fuse in order for the circuit to resume operation.

A circuit breaker is a mechanical overcurrent protection device that trips to an open-circuit condition in response to high current. A circuit breaker does not have to be replaced after it trips, but must be manually reset to the closed-circuit condition before the circuit may resume operation.

A circuit overcurrent protection device is said to be self-resetting if, after tripping to the open-circuit condition, it is able to return to a closed-circuit condition without replacement or any other servicing. Self-resetting circuit overcurrent protection devices have been produced which make use of materials having a positive temperature coefficient of resistivity. Such materials exhibit an electrical resistivity which is relatively low at a design operating temperature and increases abruptly as the temperature of the material rises beyond a critical temperature. PTC materials include compositions such as conductive polymers and ceramics. PTC circuit overcurrent protection devices are manufactured by the Raychern Corporation, and are used in many electrical devices and environments.

A PTC circuit overcurrent protection device comprises a layer of PTC material sandwiched between two parallel plates of electrically conductive metal. An electrical lead is attached to each of the plates and the leads are connected to the electrical circuit. At a given operating temperature, there is a maximum steady level of electrical current which can pass from one plate to the other through the PTC material without causing significant resistance heating of the device. This level of current is dependent primarily upon the surface area of the layer of PTC material across which the current must flow in passing from one plate to the other, and is known as the "pass" or "hold" current.

Such a PTC device is designed so that when it is subjected to a level of current greater than the hold current, sufficient resistance heating of the device occurs to cause the temperature of the PTC material to climb to above the critical temperature. When this occurs, the electrical resistivity of the PTC layer becomes so great as to create what is essentially an open circuit. A very low level of current continues to pass between the metal plates, however, and this "trickle" of current may be sufficient to prevent the temperature of the device from dropping back below the critical temperature. The circuit must be broken at some other point, for example by switching off an electrical device powered by the circuit, in order for the trickle of current to cease and allow the PTC device to cool down to below its critical temperature so that the PTC material resumes its lower resistivity state. Once this occurs, the PTC circuit overcurrent protection device has essentially reset itself, without the need for any replacement or maintenance of the device, and is again able to provide protection against overcurrent conditions when the electrical device is switched back on.

A limitation on the practical use of known PTC circuit overcurrent protection devices resides in the fact that an increase in the hold current of such a device can only be achieved by increasing the surface area of the device. For example, the surface area of a PTC circuit overcurrent protection device must roughly double in size to achieve an increase in hold current from 5 amps to 10 amps, yielding a device that, while very thin, has a large surface area. Accordingly, known PTC circuit overcurrent protection devices having relatively high hold currents are of a size and shape making them unsuitable for use in certain environments where space is limited, such as automotive vehicle fuse boxes.

In particular, many automotive electrical systems and devices are designed to employ what are known as "mini-fuses," conventional fuses measuring only about 14 millimeters (mm.) high by 11 mm. wide by 4 mm. thick and having ratings up to 20 amps. In some situations where it would be desirable to replace the conventional, non-resettable mini-fuses with a self-resetting PTC device, this replacement is not feasible due to the much larger size of the currently available PTC devices.

SUMMARY OF THE INVENTION

It is an object of the present invention to provide a self-resetting circuit overcurrent protection device having a size and hold current suitable for use in automotive vehicle fuse boxes and other space-limited environments.

Another object of the invention is to provide a self-resetting circuit overcurrent protection device having a hold current and a physical configuration allowing it to be used to replace a conventional automotive fuse of the type having a body in the form of a rectangular prism and two blade terminals projecting therefrom.

In general, these objectives are achieved by a multi-element PTC circuit protection device wherein two or more flat PTC elements, each comprising a layer of PTC material sandwiched between two metal plates, are disposed in a parallel, overlapping configuration and connected in electrical parallel. The resulting circuit protection device has a hold current equal to the sum of the hold currents of the component PTC elements, while having a surface area no greater than that of a PTC device comprising only one of the component PTC elements.

In the preferred embodiment of the invention disclosed herein, two PTC elements are disposed in a parallel, overlapping arrangement and are separated by an electrically insulating layer. An electrically insulating jacket covers the devices to form a fuse body. One of the metal plates belonging to each of the PTC elements has a blade terminal integrally formed therewith which extends downwardly from the fuse body, projecting out of the insulating jacket. The blade terminals are of a size and shape substantially identical to the terminals of a standard automotive fuse which the device is intended to replace.

The parallel electrical connection between the first and second PTC elements of the present invention is achieved by connecting the plate of the first element having the blade terminal to the plate of the second element having no terminal, and connecting the plate of the second element having the blade terminal to the plate of the first element having no terminal.

The parallel electrical connection between the PTC elements of the invention self-resetting circuit overcurrent protection device results in the device having a hold current equal to the sum of the hold currents of each individual PTC element. The hold current of the resulting device is thus doubled with respect to a single element PTC device without a commensurate increase in the surface area of the circuit protection device. While the thickness of the invention device is increased over the known, single-element PTC devices, such an increase in thickness is, because of the extreme thinness of a PTC element, so slight as to be of no practical significance in many applications. In particular, when the invention self-resetting circuit overcurrent protection device is intended to replace a conventional fuse the increased thickness may result in the invention device substantially equal in thickness to the fuse.

Accordingly, the invention multi-element device is suitable for use in many operating environments where the prior art, single-element PTC devices would be too large. In particular, the invention self-resetting circuit overcurrent protection device may be designed to have a hold current equal to that of a conventional automotive-type fuse and have an overall size and shape substantially identical to the fuse so that the self-resetting circuit overcurrent protection device may be used to replace the fuse without any redesign of the fuse environment.

These and other objects, features, and advantages of the present invention will be more clearly understood from the following written description, considered in combination with the accompanying drawings.

DETAILED DESCRIPTION OF THE PREFERRED EMBODIMENT

Figure 1:
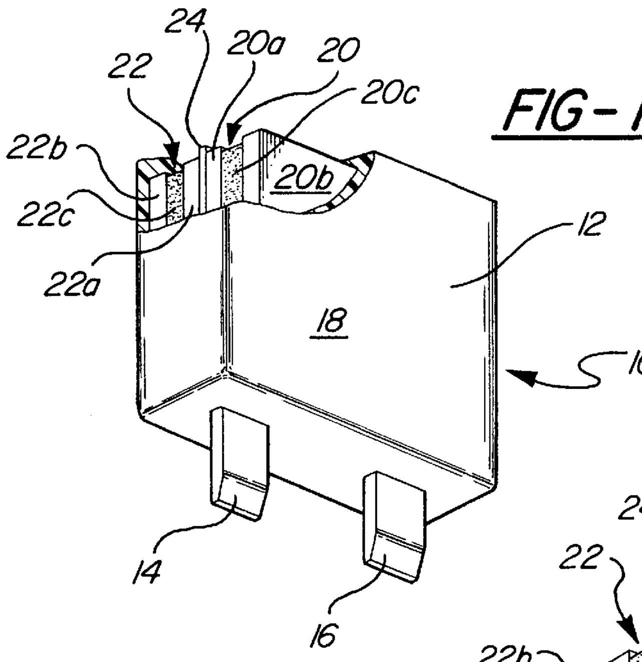
FIG. 1 is an enlarged, partially cut-away perspective view of a self-resetting circuit overcurrent protection device according to the present invention.
Figure 2:
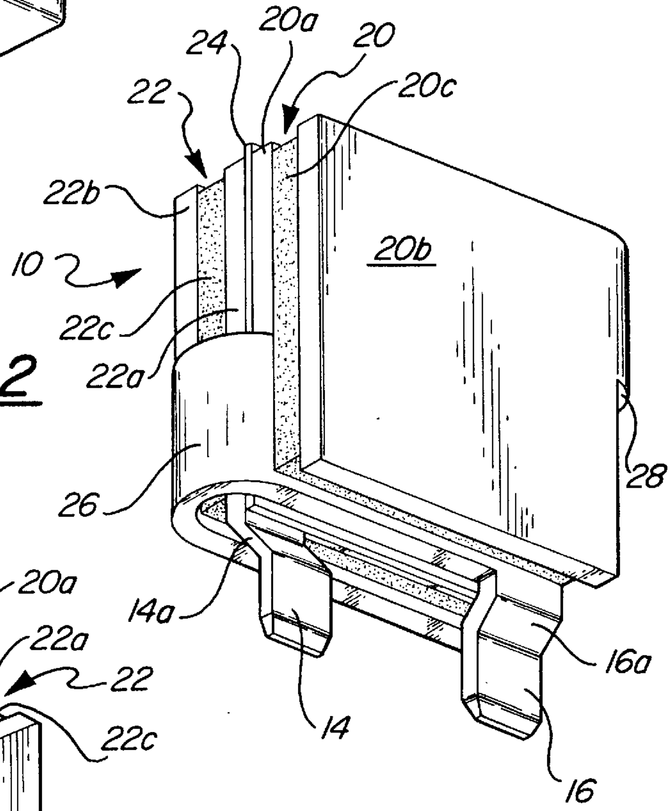
FIG. 2 is a perspective view of the self-resetting circuit overcurrent protection device of FIG. 1 with the insulating jacket of the device completely removed.
Figure 3:
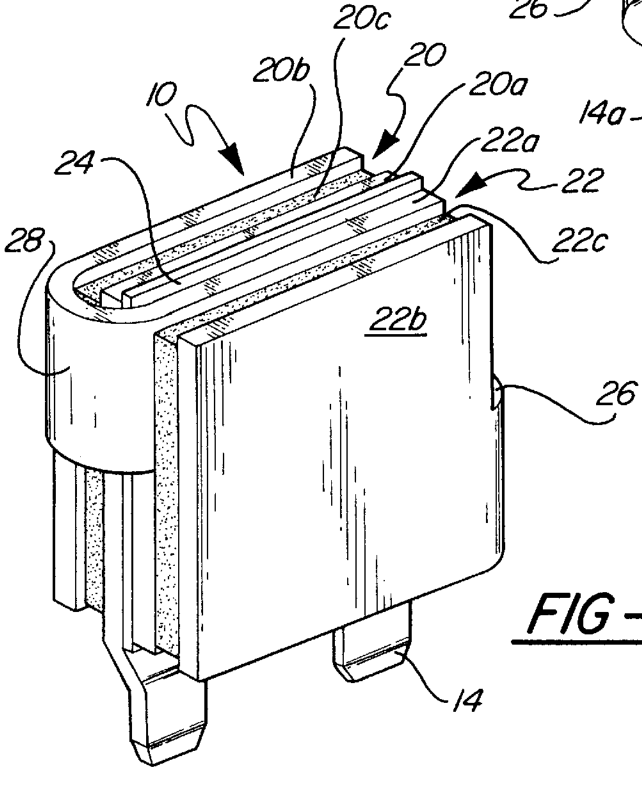
FIG. 3 is a perspective view of the self-resetting circuit overcurrent protection device of FIG. 2 taken from the other side.

The invention self-resetting circuit overcurrent protection device 10, as depicted in FIGS. 1–3, comprises a body 12 in the general shape of a rectangular prism and two terminal blades 14, 16 extending from a lower end of the body. Body 12 comprises an outer jacket 18 of an electrically non-conductive material surrounding first and second positive temperature coefficient (PTC) elements, 20 and 22 respectively, disposed in a parallel, overlapping relationship with one another. First PTC element 20 comprises an inner plate 20*a* and an outer plate 20*b* separated by a layer of PTC material 20*c*. Second PTC element 22 is substantially identical to the first PTC element, comprising an inner plate 22*a* and an outer plate 22*b* separated by a layer of PTC material 22*c*. An electrically insulating layer 24 is disposed between the adjacent inner plates 20*a* and 22*a* of the two PTC elements, and may, for example, be a thin film of Mylar. Jacket 18 may, for example, be formed of polyvinylchloride, an epoxy polymer, or some other polymeric insulating material.

Plates 20*a*, 20*b*, 22*a*, 22*b* are substantially rectangular, equal to one another in size, and are formed of an electrically conductive metal. Terminal blades 14, 16 extend from the lower edges of inner plates 22*a*, 20*a* respectively and may be formed integrally therewith. The terminal blades have angled "dog leg" portions 14*a*, 16*a* immediately adjacent their respective plates so that the distal portions of the blades are co-planar with one another and are offset from yet substantially parallel to their respective plates.

Inner plate 20*a* and outer plate 22*b* are electrically connected to one another by a jumper 26 which wraps around the edge of the device. Jumper 26 may be formed integrally with plates 20*a* and 22*b* or may be soldered or otherwise connected thereto. Likewise, inner plate 22*a* and outer plate 20*b* are electrically connected to one another by a jumper 28. This configuration of connections results in first and second PTC elements 20, 22 being connected in electrical parallel. That is, current which enters circuit overcurrent protection device 10 through one of terminal blades 14, 16 follows a parallel path through the two PTC elements before exiting through the other terminal blade. Specifically, electrical current entering device 10 through terminal blade 14 flows to inner plate 22*a* and to outer plate 20*b* via jumper 28, passes through PTC layers 22*c* and 20*c* to outer plate 22*b* and inner plate 20*a* respectively, and out of the device through terminal blade 16.

Self-resetting circuit overcurrent protection device 10 may be intended for use as a replacement for a conventional fuse of the type having a rectangular body and a pair of parallel terminal blades extending therefrom, such as a mini-fuse. When this is the case, body 12 is designed to be of a configuration substantially identical to that of the fuse body, and terminal blades 14, 16 are of a size, shape and spacing substantially identical to the terminals of the fuse.

In the accompanying drawings, the thicknesses of the various layers of device 10 are exaggerated for clarity. A PTC element of the type used in the present invention has plates on the order of 0.5 mm. thick and a PTC layer on the order of 0.5 mm. thick.

As is well known in the art, when the flow of current through circuit overcurrent protection device 10 increases to a level above the designed hold current of the device, resistance heating of plates is sufficient to raise the temperature of PTC layers 20*c*, 22*c* to above a critical temperature of the PTC material. Due to the molecular properties of the PTC material, at temperatures above the critical temperature the electrical resistivity of the PTC material rises abruptly, such that current flow between the inner and outer plates of each PTC element is all but completely prevented. A very small "trickle" level of current flow continues, however, and this trickle current may be of sufficient magnitude to prevent the PTC elements from cooling down to below their critical temperature and returning to their lower resistivity, closed circuit state. Accordingly, the circuit in which circuit protection device 10 is installed must be switched off or otherwise open-circuited at some other location before the self-resetting circuit overcurrent protection device can cool down and reset.

By arranging two or more PTC elements in the parallel, overlapping arrangement depicted herein and connecting them in electrical parallel, it is possible to fabricate a self-resetting circuit overcurrent protection device having a hold current equal to integer multiples of the hold current of a conventional single-element PTC device while having a surface area no larger than the single-element device. The greater thickness of the multi-element self-resetting circuit overcurrent protection device is more acceptable in many applications, particularly those in which a self-resetting circuit overcurrent protection device is intended to replace a conventional fuse having a rectangular body and terminal blades.

Whereas a preferred embodiment of the invention has been illustrated and described in detail, it will be apparent that various changes may be made in the disclosed embodiment without departing from the scope or spirit of the invention.

The invention claimed is:

1. A self-resetting circuit overcurrent protection device comprising:

at least two positive temperature coefficient elements, each element having parallel first and second electrically conductive plates separated by a layer of material having a positive temperature coefficient of resistivity, the at least two positive temperature coefficient elements being disposed in overlapping, substantially parallel relationship to one another such that the first plate of each of the elements is immediately adjacent the second plate of an adjacent element;

at least one layer of electrical insulating material disposed between the adjacent first and second plates of the at least two positive temperature coefficient elements;

means for electrically connecting the first plates of each of the elements with one another;

means for electrically connecting the second plates of each of the elements with one another; and a first electrical lead connected to the first plate of one of the at least two elements and a second electrical lead connected to the second plate of one of the at least two elements, the first and second leads extending from the first and second plates respectively for connection to a circuit.

2. A self-resetting circuit overcurrent protection device according to claim 1 wherein the electrical leads are flat blades.

3. A self-resetting circuit overcurrent protection device according to claim 2 wherein the blades are integral extensions of two of the electrically conductive plates.

4. A self-resetting circuit overcurrent protection device according to claim 2 wherein the blades are configured to be substantially identical with blades of a conventional fuse, whereby the device is insertable into electrical connection with a fuse receptacle adapted to receive the conventional fuse.

5. A self-resetting circuit overcurrent protection device according to claim 1 further comprising an electrically insulating envelope substantially surrounding the positive temperature coefficient elements, the electrical leads projecting out of the insulating envelope.

6. A self-resetting circuit overcurrent protection device according to claim 5 wherein the insulating envelope has an external configuration substantially similar to a conventional fuse having an amperage rating equal to a hold current of the device.

7. A self-resetting circuit overcurrent protection device according to claim 1 wherein the positive temperature coefficient material is a polymer.

8. A self-resetting circuit overcurrent protection device according to claim 1 wherein the positive temperature coefficient material is a ceramic.

9. A self-resetting circuit overcurrent protection device according to claim 1 wherein the means for electrically connecting the first plates is integral with the first plates.

10. A self-resetting circuit overcurrent protection device according to claim 9 wherein the means for electrically connecting the first plates wraps around an edge of the positive temperature coefficient layer of one of the elements.

11. A self-resetting circuit overcurrent protection device according to claim 9 wherein the means for electrically connecting the second plates is integral with the second plates.

12. A self-resetting circuit overcurrent protection device adapted to replace a conventional fuse having an amperage rating and a body with two leads extending therefrom, the device comprising:

at least two positive temperature coefficient elements, each element having parallel first and second electrically conductive plates separated by a layer of material having a positive temperature coefficient of resistivity, the at least two positive temperature coefficient elements being disposed in overlapping, substantially parallel relationship to one another with the first plate of each of the elements immediately adjacent to and separated from the second plate of an adjacent element by a layer of electrically insulating material, the first plates of each of the elements being electrically connected with one another and the second plates of each of the elements being electrically connected with one another such that the positive temperature coefficient elements are connected in electrical parallel with one another, the elements being of proper size to yield a hold current for the device substantially equal to the fuse amperage rating;

an electrically insulating envelope substantially surrounding the at least two positive temperature coefficient elements and having an external configuration substantially similar to the fuse body; and a first electrical lead connected to the first plates and a second electrical lead connected to the second plates, the first and second leads extending from the positive temperature coefficient elements and configured to be substantially identical with the leads extending from the fuse.

* * * * *

UNITED STATES PATENT AND TRADEMARK OFFICE

CERTIFICATE OF CORRECTION

PATENT NO. : 5,818,676

DATED : October 6, 1998

INVENTOR(S) : Wm. Gronowicz

It is certified that error appears in the above-identified patent and that said Letters Patent is hereby corrected as shown below:

Column 1, Line 38, delete "Raychern" and insert -- Raychem --.

Signed and Sealed this

Twenty-third Day of March, 1999

Attest:

Q. TODD DICKINSON

*Attesting Officer*

*Acting Commissioner of Patents and Trademarks*